June 14, 1955  A. A. DOWD  2,710,561
AMMUNITION BOX
Filed Feb. 18, 1950  3 Sheets-Sheet 1
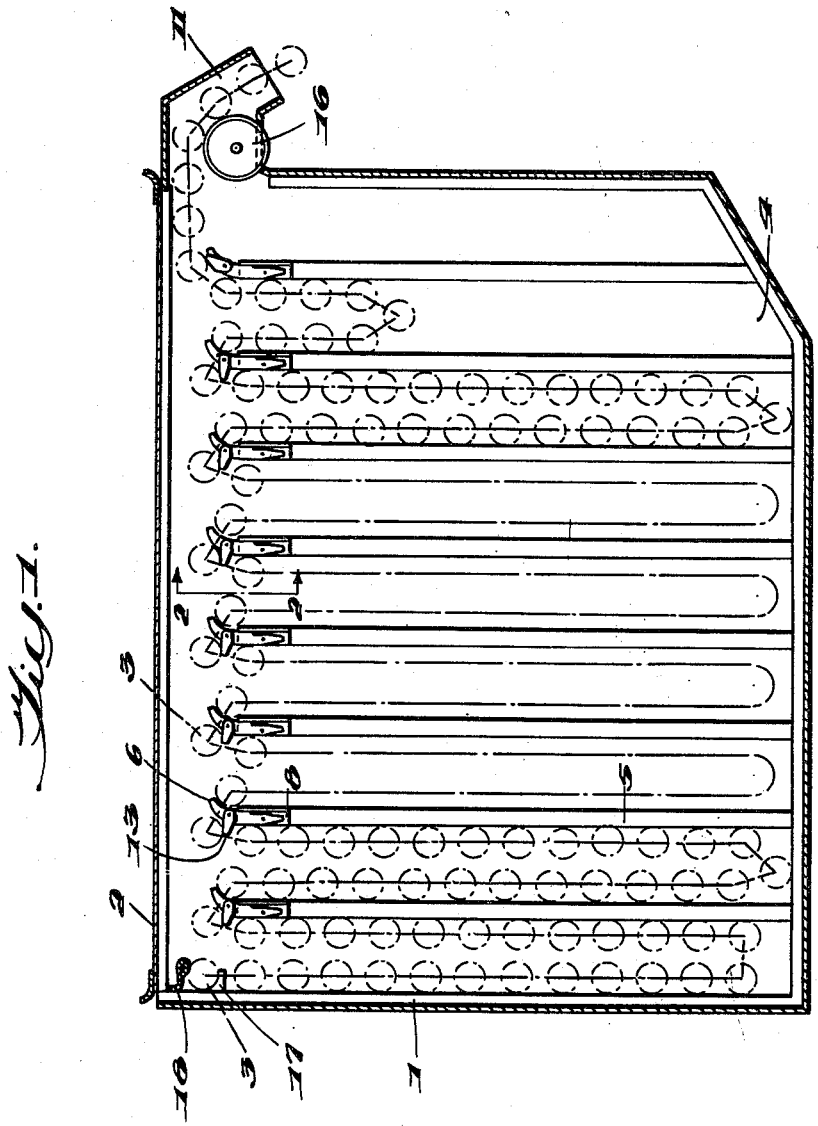
INVENTOR.
ALBERT A. DOWD,
BY
ATTORNEY June 14, 1955
A. A. DOWD
2,710,561
AMMUNITION BOX
Filed Feb. 18, 1950
3 Sheets-Sheet 2
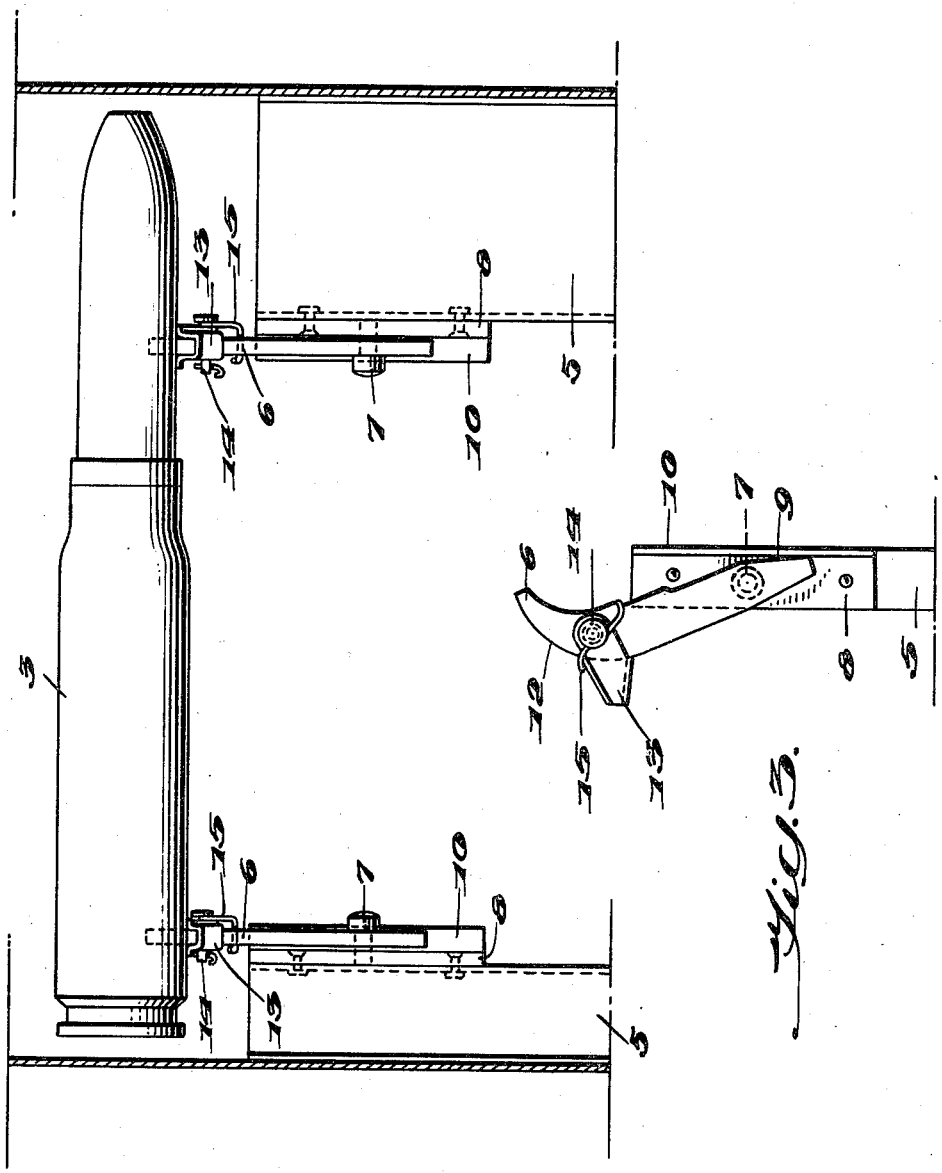
INVENTOR.
ALBERT A. DOWD,
BY
ATTORNEY June 14, 1955     A. A. DOWD     2,710,561
AMMUNITION BOX
Filed Feb. 18, 1950     3 Sheets-Sheet 3
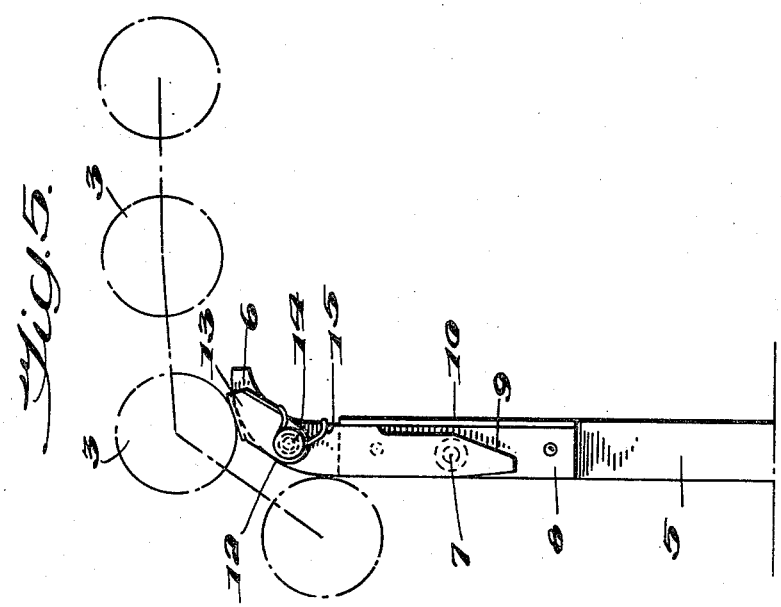
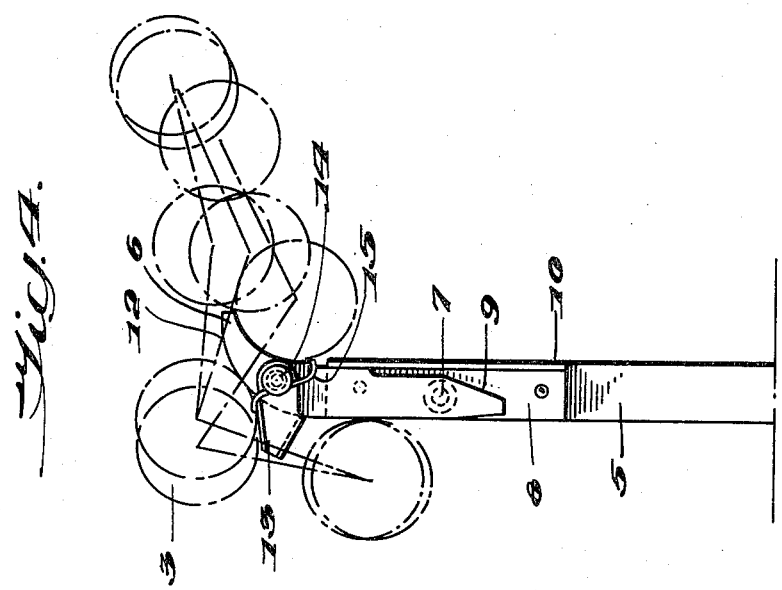
INVENTOR.
ALBERT A. DOWD,
BY
ATTORNEY United States Patent Office 2,710,561
Patented June 14, 1955

2,710,561
AMMUNITION BOX

Albert A. Dowd, Middle River, Md., assignor to The Glenn L. Martin Company, Middle River, Md., a corporation of Maryland Application February 18, 1950, Serial No. 144,940

5 Claims. (Cl. 89—34)

This invention relates to ammunition boxes and more particularly to means for preventing cartridge belts from jamming therein.

The realization of high speed military aircraft embodying the advanced electronic fire control systems now in use has necessitated parallel improvements in the mechanical devices which operate in conjunction therewith. High speed, remote controlled turrets must be much more dependable in their operation than are the turrets embodying conventional methods of operation because of the increased complexity of the arrangement and general inaccessibility of the parts. Even if causes of failures were readily ascertainable, the firing time of a gun in range is so very short that repairs are out of the question. This is more or less true of any aircraft gun installation, and it is obvious that the problem becomes more critical with the greater and greater speeds attainable by modern aircraft. The operation of such a turret must therefore be absolutely dependable.

The most frequent mechanical failure of a turret in operation occurs in the auxiliary shell feeding and supply mechanism. The guns themselves, if properly maintained, rarely cause trouble. The rapidity with which shells may be fired makes it necessary to provide considerable storage of ammunition to afford protection of the aircraft throughout its mission. This storage must be such that the supply of shells is always available to the guns without manual assistance. The cartridges are normally connected together by separable links so as to constitute a flexible ammunition belt which extends from the gun to a suitable ammunition box, from which the belt is automatically withdrawn as the gun is fired. Ammunition boxes for this purposes are well known and have continuously been a source of trouble. In aircraft installations these troubles are magnified because turret operation is commonly required in any position thereof with respect to the direction of the pull of gravity, or with respect to varying inertia forces which invariably increase the probability of jamming. Several designs are in use at the present time which function satisfactorily provided the box and its contents remain in the normal position and are not subjected to inertia forces, but these impose restrictions which are impossible to meet. Gun turrets are unavoidably subjected to vibration and rough treatment, especially in aircraft installations. This invention permits shells to be removed from the box at any desirable rate and at any absolute position or rate of change in position of the box, without jamming.

The general construction of ammunition boxes is such that a plurality of partitions within the box form open compartments for positively positioning the cartridge belt therein and holding it in place irrespective of whether the box is full, or nearly empty. These partitions are a constant source of trouble in that the cartridge belt, looped in the several compartments, rides the top of every partition, and as a result quite frequently causes a jam by binding thereon when the box is subjected to inertia forces, or by catching on the partitions when being rapidly drawn therefrom.

An object of this invention is to design an ammunition box which will permit a cartridge belt to be removed therefrom without jamming when the box is in any position relative to the direction of the force of gravity and without regard to the effects of acceleration.

Another object of this invention is to design an ammunition box which will allow a cartridge belt to be removed therefrom at any desired speed without jamming.

Another object of this invention is to provide a means for preventing retrograde movement of a cartridge belt over the partitions of an ammunition box.

Still another object of this invention is to design an ammunition box which may be quickly and easily loaded.

Further and other objects will become apparent from the accompanying description and drawings which form a part of this disclosure and in which like numerals refer to like parts.

In the drawing:

Figure 1 is a reduced sectional side view of an ammunition box embodying the invention.

Figure 2 is a full scale fragmentary sectional view of the ammunition box, taken on the line 2—2 shown in Figure 1.

Figure 3 is a side view of the tip portion of a partition, in loading position.

Figures 4 and 5 are side views of the tip portion of a partition showing the relative positions of the shells with respect to the tip portion at various stages of their removal as they are drawn from a particular compartment.

Ammunition box 1, a sectional side view of which is shown in Figure 1, is of an ordinary exterior design, having a lid 2 which is removable for loading box 1 with shells 3 flexibly connected to each other by links as schematically indicated in the drawing. A plurality of partitions, best shown in Figure 2, effectively function in pairs to divide the interior of the box into a plurality of compartments.

Each partition comprises a fixed lower portion 5 and an extension 6, wherein extension 6 is pivotally mounted as at 7 on a flanged face plate 8 carried by fixed portion 5. Extension 6 is beveled as at 9 below its pivot axis on the surface adjacent the flange 10 on face plate 8 so as to provide limited pivotal movement of the extension from its normal in-line position with respect to lower portion 5 to a rearward position. Extension 6 is curved forwardly towards outlet 11 and is thereby provided with a convex surface 12 over which shells 3 may pass. A pawl 13 is pivoted by use of a pin 14 to extension 6 adjacent its convex surface 12 so as to extend rearwardly therefrom. Limited pivotal movement of pawl 13 is obtained whereby it may move from the rearwardly projected position, upwards to a generally in-line position with respect to convex surface 12 on extension 6. Pawl 13 is so positioned with respect to the tip portion of each partition as to support the uppermost shell of the forward column of shells in its particular compartment 4. Spring 15 surrounding pivot pin 14 about which pawl 13 moves, tends to maintain pawl 13 in its rearwardly projecting position by having the ends thereof contacting extension 6 and pawl 13. Exit outlet 11 in the forward end of ammunition box 1 as shown in Figure 1 provides a means for removing shells 3 therefrom. Roller 16 rotatably supported near outlet 11 reduces the drag of shells as they pass thereover and out of box 1.

A beveled projection 17 is rigidly attached to the rearward wall of box 1 near lid 2 for supporting end shell 3 of the cartridge belt as shown in Figure 1. Spring clamp 18, connected to the rearward wall of box 1, grips end shell 3 and holds it in a seated position on projection 17. The gripping force applied by spring clamp 18 is of such magnitude as to prevent shell 3 from becoming unseated due to the inertia forces acting on box 1, yet not of such magnitude as to prevent shell 3 from being drawn from the seated position by the normal tension force applied to the belt by the gun feeding mechanism (not shown).

Box 1 may be quickly and easily loaded with shells 3 as described below. After removing lid 2, the cartridge belt is pulled through outlet 11 into box 1. Pivoted extensions 6 are moved to the rearward position before attempting to lower the belt into compartments 4. With the extensions in the rearward position, the most forward compartment is readily accessible and therefore is the first compartment to be filled. After filling the forward compartment with the belt, extension 6 on the adjacent partition is pivoted forward to its normal position and shell 3 is seated on pawl 13 as the belt is started into the second most forward compartment. The weight of the belt in the compartment forward of the partition, tends to hold extension 6 in proper position. The second most forward compartment is filled as was the most forward compartment before the second extension, forming part of the rear wall of the second compartment, is pivoted forward to its normal position. Then a shell is seated on its pawl in like manner. This procedure is followed until all of the shells are stored within the compartments. To maintain the necessary control over the belt, the end shell is seated on beveled projection 17 and held in position by spring clamp 18. It is not necessary that all the compartments be filled with the cartridge belt, but in such a case the belt is draped over the partitions forming the empty compartments so that the end shell may be clamped in position as described. Lid 2 is then placed back on the loaded ammuntion box and the shells stored therein may be drawn, as needed, through outlet 11.

Pawl 13, during removal of the shells from box 1 is pivoted upwards by the force of shells passing thereover in the manner shown in Figures 1 and 5. The tip portions of the plurality of partitions in conjunction with the pawls allow the belt of shells to move in only one prescribed direction. This is of utmost importance since it has been ascertained that the major cause of jams within an ammunition box having partitions is that the two top shells on either side of the partition are pulled downward by the weight of the belt, by inertia, or by retrograde movement with such force as to lodge thereover and thus prevent ordinary removal. By supporting the top shell as provided by this invention such action is prevented.

The general shape of extension 6 is found to be best for maintaining the closest possible control of the shells wherein the exact shape of the curved portion and relative position of the pawl thereto is governed by the size of shells 3 and the spacing between them as shown in Figure 4 by the superimposed shell positions as they move to clear the partition.

The direction and location of the various parts as described and claimed are with respect to the ammunition box in the normal upright position shown by Figure 1, wherein lid 2 is at the top, and outlet 11 is in the forward end, of box 1. This arrangement is merely a convenient method of identifying the relative positions of the various parts and is in no sense intended to limit the invention.

It is to be understood that certain changes, alterations, modifications and substitutions can be made without departing from the spirit and scope of the appended claims.

I claim as my invention:

1. In an ammunition box having partitions forming a series of open compartments wherein a cartridge belt may be stored by looping said belt into said compartments over said partitions, said box having an outlet at its forward end through which said belt may be drawn when desired, a pawl connected to each said partition adjacent the upper end thereof for preventing retrograde movement of said belt with respect to each said compartment, said pawl being pivotally connected to said partition so as to allow limited pivotal movement thereof from a rearwardly projected position to a generally in-line position with respect to said partition for allowing said belt to pass thereover towards said outlet, spring means connected to said pawl and partition tending to maintain said pawl in said rearwardly projected position, the upper ends of said partitions being curved toward said outlet to facilitate removal of said belt.

2. In an ammunition box having partitions forming a series of open compartments wherein a cartridge belt may be stored by looping said belt into said compartments over said partitions, said box having an outlet at its forward end through which said belt may be drawn when desired, a pawl connected to each said partition adjacent the upper end thereof for preventing retrograde movement of said belt with respect to each said compartment, said pawl being pivotally connected to said partition so as to allow limited pivotal movement thereof from a rearwardly projected position to a generally in-line position with respect to said partition for allowing said belt to pass thereover towards said outlet, spring means connected to said pawl and partition tending to maintain said pawl in said rearwardly projected position, the upper end of said partition being curved toward said outlet to facilitate removal of said belt, said partition having its upper end pivotally movable with respect to the remainder of said partition, from an in-line position therewith to a rearward position, to facilitate the loading of said box.

3. In an ammunition box having partitions forming a series of open compartments wherein a cartridge belt may be stored by looping said belt into said compartments over said partitions, said box having an outlet at its forward end through which said belt may be drawn when desired, a pawl connected to each said partition adjacent the upper end thereof for preventing retrograde movement of said belt with respect to each said compartment, said pawl being so connected to said partition as to allow limited pivotal movement thereof from a rearwardly projected position to a generally in-line position with respect to said partition for allowing said belt to pass thereover towards said outlet, and spring means connected to said pawl and partition tending to maintain said pawl in said rearwardly projected position.

4. An ammunition box having partitions therein forming a series of open compartments wherein a cartridge belt may be stored by looping said belt into said compartments over said partitions, said box having an outlet through which said belt may be drawn when desired, a pawl connected to each partition adjacent the upper end thereof for preventing retrograde movement of said belt with respect to each said compartment, said pawl being so connected to said partition as to allow limited pivotal movement thereof from a generally oppositely projected position with respect to the direction of said outlet from said partition, to a generally in-line position with respect to said partition for allowing said belt to pass thereover towards said outlet, said pawl being pivoted below the upper edge of said partition so as to engagingly support the uppermost cartridge in said compartment adjacent said pawl, and spring means associated with said pawl tending to maintain said pawl in said projected position.

5. An ammunition box having partitions therein forming a series of open compartments wherein a cartridge belt may be stored by looping said belt into said compartments over said partitions, said box having an outlet through which said belt may be drawn when desired, pawls connected to said partitions adjacent the upper ends thereof and normally projecting in a direction generally opposite from said outlet for preventing retrograde movement of said belt with respect to said compartments, each said pawl being so connected to its partition as to allow limited pivotal movement thereof from said generally projected position to a generally in-line position with respect to said partition for allowing said belt to pass thereover towards said outlet.

References Cited in the file of this patent

UNITED STATES PATENTS 2,110,160     Larsson _____ Mar. 8, 1932

FOREIGN PATENTS 536,873     Great Britain _____ May 30, 1941